(12) United States Patent
Vennefron et al.

(10) Patent No.: US 6,637,271 B1
(45) Date of Patent: Oct. 28, 2003

(54) METHOD AND APPARATUS FOR IDENTIFYING AND ELIMINATING VIBRATION SYMPTOMS IN HYDRAULIC CLUTCH ACTUATORS

(75) Inventors: Arlan Vennefron, Adrian, MI (US); Jiamu Hu, Rochester Hills, MI (US)

(73) Assignee: Automotive Products (USA) Inc., Auburn Hills, MI (US)

( * ) Notice: Subject to any disclaimer, the term of this patent is extended or adjusted under 35 U.S.C. 154(b) by 52 days.

(21) Appl. No.: 10/011,799

(22) Filed: Dec. 4, 2001

(51) Int. Cl.[7] .............................. G01N 3/32; F16D 31/02
(52) U.S. Cl. .............................. 73/669; 73/1.82; 73/662; 73/663; 60/469
(58) Field of Search .................... 73/669, 1.37, 1.82, 73/662, 579, 581, 586, 11.05, 663

(56) References Cited

U.S. PATENT DOCUMENTS

| | | | |
|---|---|---|---|
| 3,693,402 A | | 9/1972 | Jones .......................... 73/11.05 |
| 4,211,105 A | * | 7/1980 | Szabo et al. .................... 73/11 |
| 4,255,965 A | | 3/1981 | Schulz et al. ............... 73/35.11 |
| 4,395,904 A | * | 8/1983 | Ivanov et al. .................. 73/118 |
| 4,947,067 A | * | 8/1990 | Habermann et al. ........... 310/51 |
| 4,998,609 A | * | 3/1991 | Nix et al. ................. 192/109 F |
| 5,277,584 A | | 1/1994 | DeGroat et al. ............... 434/29 |
| 5,320,203 A | * | 6/1994 | Wilber et al. ............. 192/109 F |
| 5,325,700 A | * | 7/1994 | Litten ......................... 73/11.06 |
| 5,372,505 A | | 12/1994 | Smith ........................... 434/67 |
| 5,816,046 A | * | 10/1998 | Paeth et al. .................... 60/469 |
| 5,969,256 A | * | 10/1999 | Hobbs ........................... 73/663 |
| 5,979,242 A | * | 11/1999 | Hobbs ........................... 73/663 |
| 6,047,596 A | | 4/2000 | Krug et al. .................... 73/162 |
| 6,430,928 B1 | * | 8/2002 | Iyer et al. ...................... 60/592 |

* cited by examiner

*Primary Examiner*—Hezron Williams
*Assistant Examiner*—Jacques Saint-Surin
(74) *Attorney, Agent, or Firm*—Young & Basile P.C.

(57) ABSTRACT

The present invention provides a method and apparatus for identifying and eliminating vibration in a hydraulic clutch actuator. The vibration is identified by using transducers to characterize the vibrational characteristics of a power train of a vehicle. That characterization is used to program a shaker on a test bed to replicate the vibrations on the vehicle in a hydraulic clutch actuator. Different hydraulic dampers may be employed to eliminate the vibration. The preferred apparatus of the present invention includes a two piece hydraulic damper which may be opened as to insert different diaphragms for testing.

10 Claims, 5 Drawing Sheets

METHOD AND APPARATUS FOR IDENTIFYING AND ELIMINATING VIBRATION SYMPTOMS IN HYDRAULIC CLUTCH ACTUATORS

FIELD OF THE INVENTION

The present invention relates to hydraulic clutch actuators and more particularly to methods of identifying and eliminating vibration symptoms in such clutch actuators including the selection of appropriate dampers therefor.

BACKGROUND OF THE INVENTION

Hydraulic actuators are commonly used to operate the clutch in a motor vehicle. In particular, such hydraulic actuators include a master cylinder connected to a slave cylinder. When the clutch pedal of a vehicle is depressed by the operator, the slave cylinder is actuated to operate the clutch in a known manner. One such example is described in commonly assigned U.S. Pat. No. 4,599,860 which is incorporated herein by reference. It is known that different motor vehicles having different power trains require different clutch actuators. In particular, the specifics of either of the master or slave cylinders may be different including spring tensions and the distances traveled by output shafts depending on the particularities of the clutch involved.

Whereas such hydraulic clutch actuators have enjoyed significant commercial success, they have been known to transmit vibrations backwardly through the system from the clutch through the clutch pedal with the result that the operator may experience unpleasant vibrations through the clutch pedal. Specifically, imbalances in the crank shaft of the engine or engine firing impulses are transmitted to the flywheel which undergoes a swashing movement. This swashing movement, in turn, leads to vibration of the spring fingers of the clutch release mechanism which are transferred to the throwout bearing of the clutch, and the vibrations propagate backwardly through the clutch actuator. In particular, the vibrations in the throwout bearing transmit to an output shaft in the slave cylinder which causes the hydraulic fluid in slave cylinder to vibrate which vibrates through the hydraulic fluid in the conduit interconnecting the slave cylinder and the master cylinder. Then, finally the vibrations propagate through the hydraulic fluid in the master cylinder to the input shaft in the master cylinder and to the clutch pedal where those vibrations are experienced by the operator.

Various devices have been proposed to attenuate these vibrations. For example, such devices have included tuned masses which are attached to various parts of the clutch system, rubber dampers, rubber hose sections, and various other damper devices. Applicant is the assignee of numerous applications directed toward dampers for hydraulic clutch actuators, including application Ser. No. 09/620,436 entitled Dual Action Damper for Hydraulic Clutch actuator and concurrently filed application entitled Triple Action Damper for Hydraulic Clutch Actuator.

It is often difficult to properly select the appropriate damper for the power train/clutch actuator combination for any given vehicle. Further, after a vehicle has been in use clutch pedal vibrations may develop and it is difficult to eliminate such vibrations. Therefore, a need has arisen to provide an improved technique to select dampers for clutch actuators as well as to address clutch pedal vibration issues associated with the existing vehicles.

SUMMARY OF THE INVENTION

The present invention provides for a method for selecting a damper for a hydraulic clutch actuator to reduce vibration at a vehicle clutch pedal. The method includes characterizing the vibration characteristics of a vehicle powertrain and replicating the vibrational characteristics of the vehicle powertrain on a test bed. The test bed includes at least a source of vibration connected to the hydraulic clutch actuator where the clutch actuator is connected to a clutch pedal. The source of vibration excites the clutch actuator. The vibration at the clutch pedal is measured and a damper is selected which reduces the measured vibration at the clutch pedal to an acceptable level.

The present invention also provides an apparatus for selecting a damper for a hydraulic clutch actuator where the hydraulic clutch actuator includes a reservoir of hydraulic fluid, and a hydraulic slave cylinder and a hydraulic master cylinder connected by a conduit. The master cylinder includes an input rod and the slave cylinder includes an output rod. The input of the slave cylinder is operatively connected to a clutch pedal and the output rod is operatively coupled to a source of vibration. A vibration transducer is operatively positioned on the clutch pedal the output of which is measured. A two piece damper including an upper portion, a lower portion, and a diaphragm there between is provided. The upper and lower portions of the damper are removably coupled to one another, with the upper portion including an inlet and an outlet. The inlet and outlet of the upper portion of the damper are operatively connected to the conduit such that the damper reduces vibration in the hydraulic fluid. The lower portion of the damper may be un-coupled from the upper portion of the damper as to evaluate different diaphragms to determine the most effective diaphragm to eliminate vibration.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

The present invention provides for a method and apparatus to select and/or tune a dampening system for a hydraulic clutch actuator to eliminate or reduce offensive vibrations at a clutch pedal. In particular, the present invention provides that the vibrational characteristics of the power train may be simulated using a shaking device. Different dampers may be evaluated in this simulated environment to determine which damper most effectively eliminates or controls unwanted vibration in the clutch pedal.

Figures 1, 4:
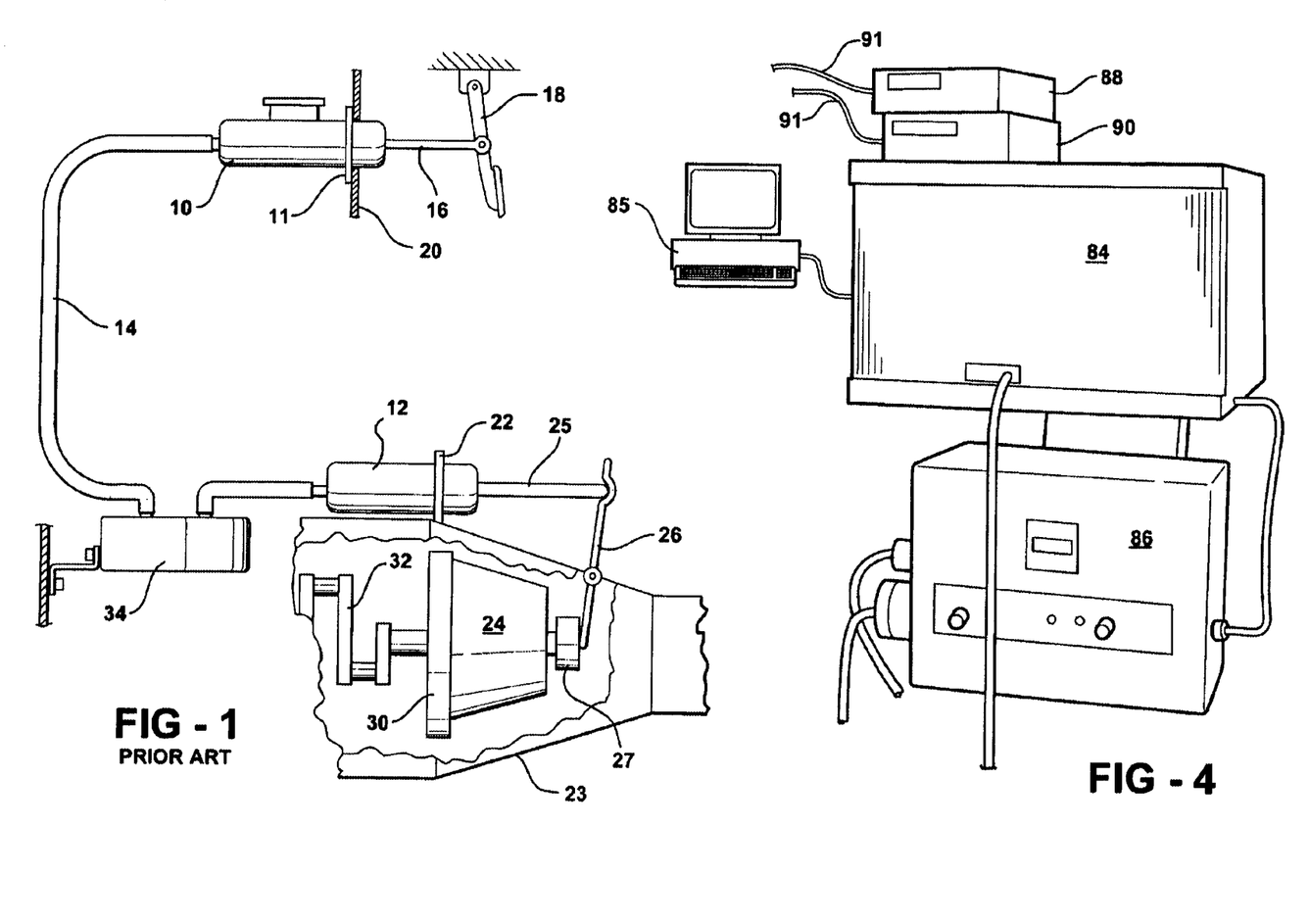
FIG. 1 is a schematic illustration of a prior art hydraulic clutch actuator including a damper.
FIG. 4 is a perspective view of a control system for a test device to select a damper for a hydraulic clutch actuator.

With reference to the figures where like elements are numbered alike and, in particular, with reference to FIG. 1, there is shown a clutch actuator mechanism according to the prior art. A hydraulic clutch actuator is schematically shown in FIG. 1 and includes a master cylinder 10, a slave cylinder 12, and a conduit 14 extending between the outlet or discharge of the master cylinder and the inlet of the slave cylinder. Master cylinder 10 includes an input rod 16 connected in a known manner to a clutch pedal 18 of an associated motor vehicle so that pivotal movement of clutch pedal 18 by the vehicle operator moves input rod 16 of master cylinder 10 which, in turn, moves an associated piston internal to the master cylinder 10 in a known manner to discharge pressurized fluid from the master cylinder 10. Master cylinder 10 further includes a flange 11 to facilitate attachment of the master cylinder to a bulkhead 20 of a vehicle.

Typically, slave cylinder 12 is secured by a bracket 22 to a bell housing 23 of the vehicle. Bell housing 23 encloses a clutch 24 of the vehicle. Slave cylinder 12 includes an output rod 25 which co-acts in a known manner with a clutch lever 26 and a throwout bearing 27 so that pivotal movement of clutch pedal 18 results in clutch 24 disengaging. More particularly, pivotal movement of clutch pedal 18 results in discharge of pressurized fluid from the master cylinder 10 through conduit 14, to slave cylinder 12 to provide extension of output rod 25 and pivotal movement of clutch lever 26 to move the throwout bearing 27 in a direction to disengage clutch 24.

Clutch 24 is driven in a known manner by a flywheel 30 which, in turn, is driven by an engine crank shaft 32. During vehicle operation, an operator may feel vibration through clutch pedal 18, and particularly when engaging clutch pedal 18. This vibration may originate from numerous sources including out of balance engine components or a weak crank shaft 32. These sources of vibration cause flywheel 30 to swash or wobble. The swashing and/or wobbling of flywheel 30, and in particular the vibration components associated therewith, are transmitted from throwout bearing 27 and clutch lever 26 through output shaft 25 of slave cylinder 12, through the hydraulic fluid to master cylinder 10, where it can ultimately be felt by the operator's foot as it is applied or even resting on clutch pedal 18. It is known to deal with these problems by putting shunt-like vibration dampers 34 in clutch actuator fluid conduit 14. Examples of such dampers are the subject of commonly assigned application Ser. No. 09/620,436 entitled Dual Action Damper for Hydraulic Clutch actuator and concurrently filed application entitled Triple Action Damper for Hydraulic Clutch Actuator which are incorporated herein by reference as if set forth in their entirety.

Hydraulic dampers, such as damper 34, may be configured in a variety of ways. Typically such dampers may include one or more diaphragms which may have different thicknesses and/or diameters. Further, dampers may be positioned at different places in conduit 14 for example, adjacent slave cylinder 12, adjacent slave cylinder 10 or somewhere in between. Further, the input and output ports of the dampers may be different in number orientation and cross-section. It may also be possible to change the type of material used in the diaphragm, the volume of the diaphragm and the pivot point of the diaphragm. All of these variables affect the degree of success the damper has in eliminating or tuning any particular vibration or collection of vibrations. Thus, different dampers work better in different situations. However, it is difficult to choose which damper is best suited to effectively eliminate or control any particular vibration. This is due, in large part, to the complexity of vibrations including their associated harmonics generally together with the complexity of the motor vehicle environment. In particular, the vehicle being evaluated including its power train and clutch actuator, will have natural frequencies and harmonics of those natural frequencies where the system is quite responsive. These frequencies are commonly known as resonances of the system. Responsiveness refers to the fact that at particular resonant frequencies of the system, there is effectively little reduction of the amplitude of those frequencies and quite possibly an increase in the amplitude of the frequencies. If the engine, and in particular the fly wheel, excites the system at or even very near a resonant frequency, the vibration transferred through the system to the clutch pedal 18 is more likely to be objectionable. The present invention allows a vehicle designer, or someone trouble shooting with respect to an existing vehicle to efficiently select or adjust a damper to effectively reduce or eliminate offensive clutch pedal vibrations.

Elimination of vibrations at the clutch pedal does not necessarily mean complete elimination of vibration at the clutch pedal. It is well known that certain vibrations are more offensive to vehicle operators than others, .e.g. vibrations at or above 3 Hz. or, at or below 300 Hz. It is appreciated that certain vibrations within this range may be particularly offensive and that the degree of offensiveness may vary from individual to individual. Further, it may be desired to transmit only a particular vibration to give the operator a certain degree of feedback. Thus elimination may involve either complete or partial elimination. For example, the desired feedback in a roadster may be different than the desired feedback in a sedan. The present invention provides a way to select a damper for a hydraulic clutch actuator to effectively eliminate or control vibrations at the clutch pedal.

Figure 2:
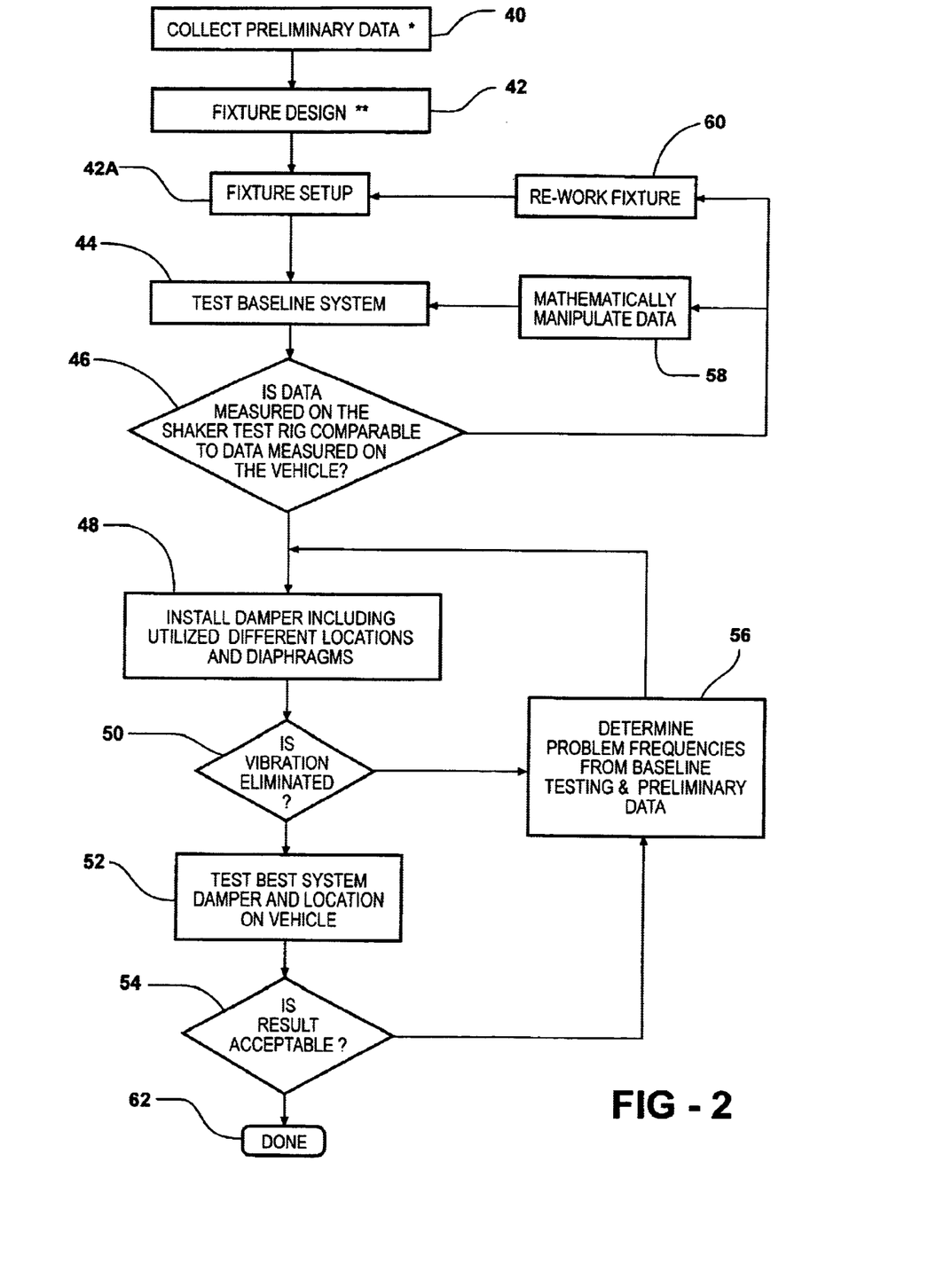
FIG. 2 is a flowchart illustrating the first preferred method of the patent invention.

With reference to FIG. 2, there is shown a flowchart illustrating a first preferred embodiment of the method of the present invention. As referenced at 40 preliminary data is collected. This preliminary data provides a characterization of the vibrational characteristics of the vehicle being evaluated. This preliminary data, may include but is not limited to, determining the deflection characteristics of the front of the dashboard, determining the deflection characteristics of the bulkhead, and measuring the vibration at throwout bearing 22 and/or clutch lever 26 and/or clutch pedal 18. Further, the preliminary data may include defining the physical limits which the damper must fit within, which may include but are not limited to, any constraints imposed by packaging, working pressure, travel loss or corrosion resistance. These physical constraints may eliminate possible locations for the damper.

In the preferred embodiment the vibration of the vehicle being evaluated is characterized by coupling a transducer (not shown) to throwout bearing clutch lever 26 of the vehicle and another transducer (not shown) to clutch pedal 18 of the vehicle. It is understood that characterizing the vibrations at these locations is merely representative and the vibration may be characterized at other locations, e.g. at throwout bearing 27, or flywheel 30 or directly on the input and output shafts of the hydraulic clutch actuator systems. Preferably the transducer is a single axis piezoelectric accelerometer although it is understood that other transducers may be used. One example of an alternate transducer would be a tri-axial piezoelectric accelerometer. It is understood that if a tri-axial piezoelectric accelerometer was employed it would be preferable to utilize a tri-axial shaker.

The vehicle is operated to identify and measure the associated vibrational characteristics at both clutch pedal 18, and clutch lever 26. In the preferred embodiment the single axis piezoelectric accelerometer produces a voltage output which varies in frequency and amplitude according to the measured component or components of the vibration, including harmonics thereof It is understood that these analog voltages may be converted to a digital format and preferably to a digital signal using an ASCII format. The ASCII format allows the information to be transferred between different programs, and it is understood that other formats may be used. The measurements collected from the transducers are made in a time domain. The data is acquired in a typical fashion. The above described acquisition hardware and software is available from National Instruments, having offices in Austin, Tex. The transducers are preferably provided by PCB Piezotronics of Depew N.Y. It is understood that other acquisition equipment including transducers, hardware and software could be used in place of the above-described equipment and software available through National Instruments and PCB Piezotronics.

In the first preferred embodiment, it is beneficial to mathematically manipulate the output from the accelerometers. These mathematical manipulations may include performance of an Auto Power Spectrum and/or known transfer functions. The Auto Power Spectrum is in essence a conversion of data from the time domain to the frequency domain. Thus, comparing the Auto Power Spectrum analysis from the throwout bearing 27 or clutch lever 26 against the Auto Power Spectrum analysis from clutch pedal 18, allows determination of what frequencies are naturally eliminated by the clutch actuator and what frequencies may be naturally added by the clutch actuator. The transfer function is merely a comparison between the Auto Power Spectrums for the vibrational input, e.g. the vibration at clutch lever 26 against the vibrational output of e.g. the vibration at clutch pedal 18. These analysis may identify the problem frequencies in the vehicle.

Figure 3:
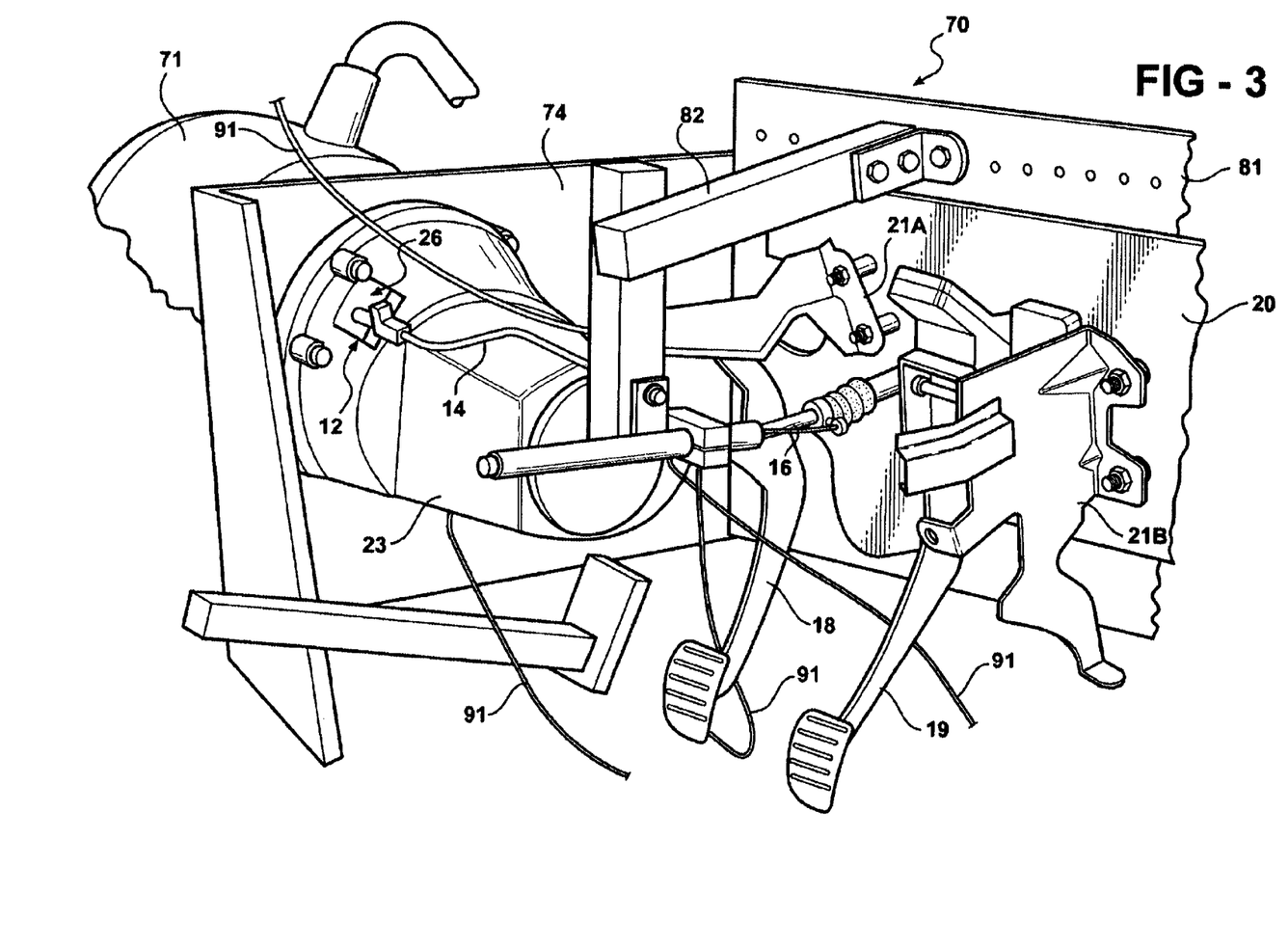
FIG. 3 is a perspective view of a portion of a test fixture used to select a damper for a hydraulic clutch actuator.
Figure 5:
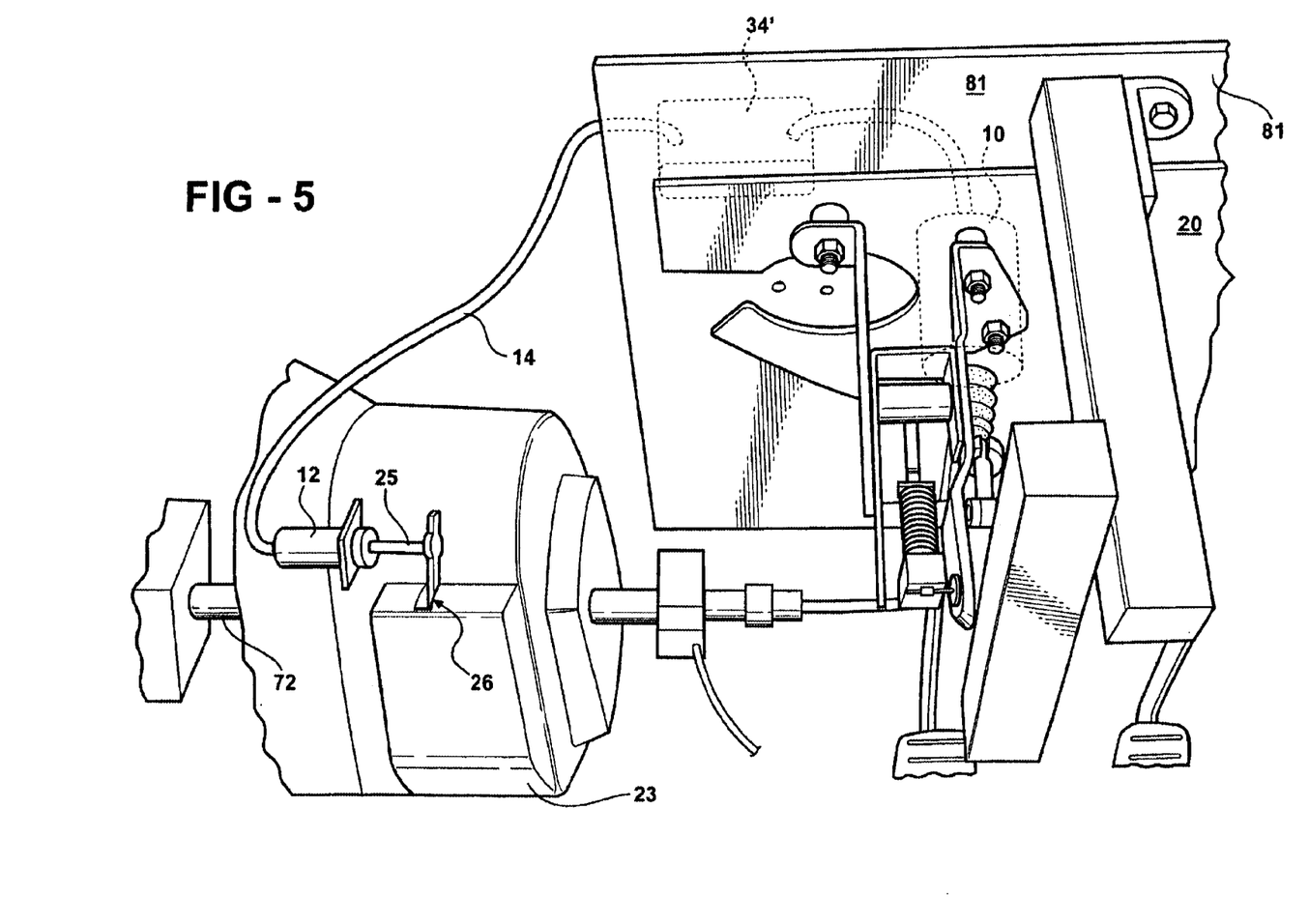
FIG. 5 is perspective view of a portion of a test fixture used to select a damper for a hydraulic clutch actuator.

The preliminary data is used to design and construct a fixture at 42 and 42A. An example of one such fixture, 70, is illustrated in FIGS. 3 and 5. In the preferred embodiment the fixture may include, but is not limited to, the bell housing 23, and those components integral thereto, (e.g. the flywheel 30, clutch 24, clutch lever 26 and throwout bearing 27, all of which are not illustrated in either FIGS. 3 or 5). Also included are the hydraulic clutch actuator including master cylinder 10, slave 12 and conduit 14 bulkhead 20 and supporting mechanisms 21A and 21B for clutch pedal 18 and brake pedal 19 (these supporting mechanisms are commonly referred to as pedal boxes). As shown bell housing 23 is mounted to an upright mounting 74. If included, flywheel 30, and clutch 24 and throwout bearing 27 are positioned within bell housing 23. These components are identical to those found on the vehicle being evaluated. The components may be physically taken from the vehicle being evaluated but it is not necessary to do so.

Bulkhead 20 is preferably mounted to a mounting 81 which, together with bulkhead 20, is configured to replicate as closely as possible the stiffness of the bulkhead of the vehicle being evaluated. Similarly, pedal boxes 21A and 21B together with clutch pedal 18 and brake pedal 19 are mounted to bulkhead 20. As shown master cylinder 10 may be positioned to the rear of mounting 81.

With reference again to FIG. 2, whether the test fixture effectively replicates the vehicle environment is determined at 44 and 46. Preferably this is done as follows. With reference to FIGS. 3 through 5 a shaker 71 may be programmed to replicate the vibrational characteristics of clutch lever 26 as previously characterized at 40. Shaker 71 is preferably a single axis shaker. Once programmed, an output shaft or stinger 72 of shaker 71 will replicate the vibrational characteristics of clutch lever 26 assuming it was characterized. FIGS. 3 and 5 illustrate an example where the vibrational characteristics of throwout bearing 27 were characterized and thus, stinger 72 is connected to clutch lever 26 which is in turn connected to output shaft 25 of slave cylinder 12. Shaker 71 is programmed using controller 84. Controller 84 is operatively interfaced with a computer 85 in a known manner. An amplifier 86 is provided for shaker 71. Controller 84 is preferably provided by Spectral Dynamics of San Jose, California, while the shaker and its amplifier is preferably provided by M B Dynamics of Cleveland, Ohio. It is understood that other shakers and controllers may also be used.

Shaker 71 is actuated and data is measured on the test fixture to determine if it is comparable to that data acquired at step 40. Preferably this is accomplished by attaching a transducer to clutch pedal 18. Preferably the transducer is identical to those used at step 40, e.g. single axis piezoelectric accelerometers. The transducer is attached in the same manner as they were attached to the vehicle being evaluated at 40. A transducer is attached on stinger 72 which provides closed loop feedback to control shaker 71. As shown in FIGS. 3 through 5 the transducers are connected via control wires 91 to readouts 88 and 90. Shaker 71 is then engaged, and the output at the transducers is measured. Thus, measurements are taken in the same manner as described above and manipulated in the same manner. That is Auto Power Spectrum analysis are performed on the data together with transfer function.

If the output from the transducers is not comparable to that collected at 40, shaker 71 may be re-programed at 58 and/or the fixture 70 may be re-worked at 60. In particular shaker 71 may need to be re-programmed if the output of stinger 72 is not comparable to that of throwout bearing 27 or clutch lever 26 and the fixture may need to be reworked if the output of the transducer attached to clutch pedal 18 is not comparable. Reprogramming shaker 71 may involve modifying the frequencies input or slightly adjusting their amplitude. The transfer function calculations made above may also be useful in adjusting shaker 71. Re-working of fixture may involve adjusting the stiffness of mounting 81 or adding or removing other components from the vehicle being evaluated. If the vibrational characteristics are similar, then the vibrational characteristics are effectively replicated on the test bed.

It may also be beneficial to run a swept-sine test through the test bed arrangement. The swept-sine test describes inputting a known vibration at a fixed amplitude into shaker 71 and measuring the output with the transducer at clutch pedal 18. In the preferred embodiment, this involves sweeping a single sine wave of constant magnitude from two to three hertz to above the range of interest. If the problem is strictly vibrational as determined by the Auto Power Spectrum measured from the test vehicle, then the range of 2 Hz to 1000 Hz is sufficient. It is understood that a range of typically up to approximately 500 Hz is acceptable for vibration problems and acoustic phenomenon may occur at higher frequencies. After measuring the output at clutch pedal 18 on the test bed, a transfer function of the type described above can be calculated to determine what vibrational frequencies are added by the clutch actuator system and what vibrational frequencies are naturally attenuated. It has been discovered that if resonant frequencies are present in the input signal from the vehicle, that these frequencies will be the ones that typically need reduction.

With reference to FIG. 2 different dampers are tested at 48, 50, 52, 54 and 56. In the preferred embodiment the testing is preferably done with an adjustable damper illustrated in FIGS. 6 and 7. A damper under evaluation is installed at 48 and it is determined at 50 whether that damper eliminated the vibration. A simulated foot 80 is positioned on a mount 78 which may actuate clutch pedal 18 to different points in its travel to determine the vibration components at different points in the travel. It is understood that the above described simulation may be repeated with simulated foot 80 displacing clutch pedal 18 to varying degrees. In this way it may be confirmed that the offensive vibrations have been eliminated throughout the range of travel of clutch pedal 18. It may also be desirable for a test engineer to physically put his/her foot on clutch pedal 18 to determine whether the chosen damper eliminates the offensive vibration.

The damper may be moved to different locations along conduit 14 at step 52. For example, the effectiveness of the damper may be better if the damper is positioned adjacent master cylinder 10 rather than slave cylinder 12, or vice versa. As shown at step 52 the vehicle constraints may not allow positioning of a damper in all possible locations. If the vibration is not eliminated at 50 the results from the sine-sweep and transfer functions may also suggest certain types of dampers or a particular damper configuration as referenced at step 56. Different dampers may be tried until the vibration measured by the accelerometer at clutch pedal 18 reaches acceptable levels Different dampers, such as single stage or multiple stage dampers may be evaluated. If the vibration is eliminated and the location of the damper fits within the constraints of the vehicle the result is acceptable as indicated at step 54 and the process is complete.

Figure 6:
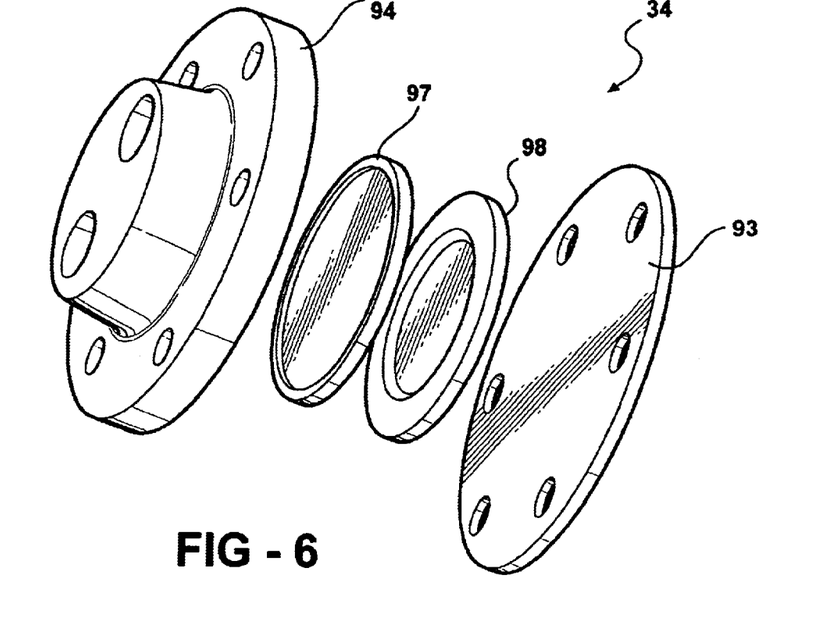
FIG. 6 is an exploded view of a two piece bolt together hydraulic clutch damper.
Figure 7:
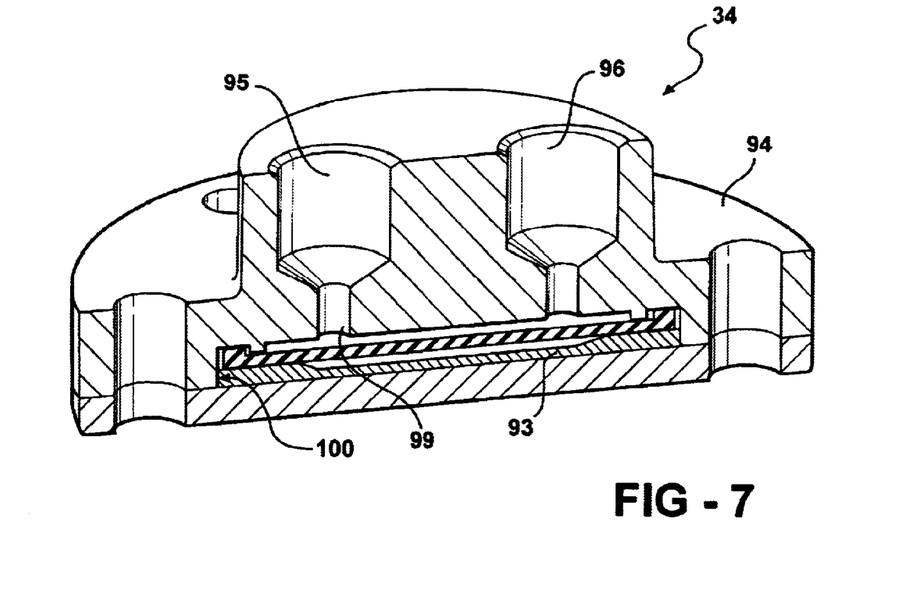
FIG. 7 is a cut away view illustrating the hydraulic clutch damper of FIG. 6 as assembled.

With reference to FIGS. 6 and 7 there is shown a bolt together damper 34 useful in evaluating different damper diaphragms. Bolt together damper 34 includes a body 92 having a top portion 94 and a bottom portion 93. Top portion 94 and bottom portion 93 are configured to be bolted together so as to create a void there between.

Positioned within the void, as illustrated are a pair of diaphragms 97 and 98.

Top portion 94 includes an inlet port and an outlet port 95 and 96 respectively. Inlet ports 95 and 96 are configured to receive conduit 14. In operation hydraulic fluid passes through inlet port 95 and impacts upon diaphragm 97. Any vibration in the hydraulic fluid is transferred to diaphragms 97 and 98. Diaphragms 97 and 98 tend to reduce the vibration in the hydraulic fluid. This reduction may be evaluated by measuring the vibration at clutch pedal 18 on the test bed. Similarly damper 34 with its particular diaphragms may effect the amount of travel in the master cylinder. Also different housings may be evaluated which have different sizes or cross sections of their input or outputs numbered 99. The inputs and outputs may also vary in their location on body 92. If the results determined by the measurements taken at clutch pedal and master cylinder are acceptable, the damper tested is satisfactory. If the results are not acceptable, upper portion 94 may be unbolted from lower portion 93, without disconnecting conduit 14 from input 95 or output 96, and different diaphragms may be inserted. Those diaphragms may then be evaluated to determine whether they effectively reduce the offensive vibrations.

It is understood that different bolt together dampers may be employed and that such different bolt together dampers may have different configurations of input and output parts. As more vehicles are simulated and dampers are selected, a database may be created so that when repeated vibrational characteristics arise, known dampening solutions may be deployed.

By utilizing the above described method and apparatus the time necessary to evaluate and select an appropriate damper for a clutch actuator is drastically reduced.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for selecting a damper for a hydraulic clutch actuator to reduce vibration at a vehicle clutch pedal, the method comprising:

characterizing the vibrational characteristics of a vehicle powertrain;

providing a shaker connected to the hydraulic clutch actuator so as to provide excitation thereto, the hydraulic clutch actuator also being operatively connected to the clutch pedal;

programming the shaker to replicate the vibrational characteristics of the vehicle power train;

actuating the shaker to excite the clutch actuator: and measuring the vibration at the clutch pedal and selecting a damper which reduces the measured vibration at the clutch pedal to an acceptable level.

2. A method as in claim 1 wherein vibration the vibrational properties of the powertrain are characterized by measuring the vibration at a throwout bearing of a clutch in the vehicle powertrain.

3. A method as in claim 2 wherein vibrational properties of the powertrain are characterized by measuring the vibration at the clutch pedal on the vehicle.

4. A method as in claim 2 wherein the vibrational characteristics are measured with an accelerometer.

5. A method as in claim 1 further comprising: confirming that the source of vibration replicates the vibration of a vehicle.

6. A method as in claim 1 wherein the basis for selecting the damper is a series of different measured vibrations at the clutch pedal, each measured vibration associated with a different damper.

7. A method as in claim 6 wherein each damper has a different diaphragm.

8. A method as in claim 6 wherein the hydraulic clutch actuator includes a hydraulic cylinder, a slave hydraulic cylinder and a conduit therebetween and the damper is positioned in line to the conduit.

9. A method as in claim 8 wherein the hydraulic clutch actuator is adjacent to the slave cylinder.

10. An apparatus for selecting a damper for a hydraulic clutch actuator for a motor vehicle, the hydraulic clutch actuator comprising a reservoir of hydraulic fluid, a hydraulic slave cylinder including an output rod, a hydraulic master cylinder including an input rod, the master cylinder and slave cylinder being connected by a conduit, the input of the slave cylinder being operatively connected to a clutch pedal, the apparatus comprising:

a shaker operatively coupled to the output rod of the slave cylinder means for characterizing the vibrational characteristics of a vehicle power train means for programming the shaker to replicate the vibrational characteristics of the vehicle power train, and a two piece damper including an upper portion, a lower portion, and a diaphragm there between, the upper and lower portions of the damper being removably coupled to one another, the upper portion including an inlet and an outlet, the inlet and outlet being operatively connected to the conduit such that the damper reduces vibration in the hydraulic fluid wherein the lower portion of the damper may be un-coupled from the upper portion of the diaphragm as to evaluate different diaphragms to determine the most effective diaphragm to eliminate vibration.

* * * * *